United States Patent [19]
Belongia et al.

[11] Patent Number: 6,113,966
[45] Date of Patent: Sep. 5, 2000

[54] RAPID CYCLE BREADMAKER

[75] Inventors: David C. Belongia; Joanne V. Turchany, both of Kewaskum, Wis.

[73] Assignee: The West Bend Company, West Bend, Wis.

[21] Appl. No.: 09/061,348

[22] Filed: Apr. 16, 1998

[51] Int. Cl.[7] .............................. A21D 8/00; A27J 27/00; A47J 37/00
[52] U.S. Cl. .............................. 426/496; 99/326; 99/327; 99/331; 99/332; 99/335; 99/348; 99/486; 426/523
[58] Field of Search ............................... 426/19, 27, 496, 426/504, 519, 523, 549; 99/326, 327, 331, 332, 335, 348, 484, 468, 486; 366/98, 145, 146, 314

[56] References Cited

U.S. PATENT DOCUMENTS

| | | | |
|---|---|---|---|
| 4,538,509 | 9/1985 | Ojima et al. | 99/348 |
| 4,762,057 | 8/1988 | Hirota et al. | 99/348 |
| 4,776,265 | 10/1988 | Ojima | 99/348 |
| 4,903,587 | 2/1990 | Nagasaka et al. | 99/348 |
| 4,903,588 | 2/1990 | Horiuchi et al. | 99/348 |
| 4,903,589 | 2/1990 | Aoyama | 99/348 |
| 4,951,559 | 8/1990 | Arao et al. | 99/348 |
| 4,957,040 | 9/1990 | Nakakura et al. | 99/348 |
| 4,984,512 | 1/1991 | Takahashi et al. | 99/348 |
| 5,019,972 | 5/1991 | Rim | 99/331 |
| 5,076,153 | 12/1991 | Takahashi et al. | 99/348 |
| 5,386,763 | 2/1995 | Chen | 99/348 |
| 5,392,695 | 2/1995 | Junkel | 99/348 |
| 5,410,949 | 5/1995 | Yung | 99/348 |
| 5,415,081 | 5/1995 | Yoshida et al. | 99/348 |
| 5,426,580 | 6/1995 | Yoshida et al. | 99/348 |
| 5,433,139 | 7/1995 | Kitagawa et al. | 99/348 |
| 5,435,235 | 7/1995 | Yoshida | 99/348 |
| 5,466,913 | 11/1995 | Tanimoto et al. | 99/348 |
| 5,510,127 | 4/1996 | Wong et al. | 426/19 |
| 5,528,979 | 6/1996 | Yoshida | 99/348 |
| 5,531,153 | 7/1996 | Maruyama et al. | 99/327 |
| 5,584,230 | 12/1996 | Yoshida et al. | 99/348 |
| 5,605,090 | 2/1997 | Mantani et al. | 99/348 |
| 5,615,605 | 4/1997 | Kakimoto et al. | 99/348 |
| 5,628,240 | 5/1997 | Yoshida | 99/348 |
| 5,665,410 | 9/1997 | Turchany et al. | 426/504 |

OTHER PUBLICATIONS

Regal Ware, Inc. publication entitled *Breadmaker Guide & Cookbook, Model Nos. K6743S/K6744S/K6746S,* publication date unknown.

Primary Examiner—George C. Yeung
Attorney, Agent, or Firm—Michael Best & Friedrich LLP

[57] ABSTRACT

A rapid cycle household automatic breadmaker for producing bread has a total cycle time in the order of about one hour, including a kneading cycle of 10 minutes, a rise time cycle of twenty minutes and a baking cycle of thirty minutes. In producing a loaf of bread, the bread ingredients are preheated by hot water to a preheat temperature of about 49° C. to 54° C. and maintained at the preheat temperature for the duration of the kneading cycle and for at least a portion of the rise time. The bread dough is baked at a temperature of about 216° C. to 232° C. during the baking cycle.

20 Claims, 7 Drawing Sheets

RAPID CYCLE BREADMAKER

BACKGROUND OF THE INVENTION

This invention relates generally to automatic breadmakers and, more particularly, to a household automatic breadmaker having a rapid cycle time.

Automatic breadmakers for home use are becoming increasingly popular, in part because the user is able to prepare specialty and custom loaves of bread of a type not available or not readily available at commercial outlets. Another reason for the popularity of such breadmakers is the conclusion of baking. Warm, freshly baked bread has a unique aroma and texture that adds to dining pleasure.

There are several discrete periods involved in producing bread using an automatic breadmaker. The dough ingredients (e.g., wheat flour, sugar, water, milk, yeast, shortening, salt, etc.) are first combined and then kneaded by the breadmaker for a specific time. During this time period, carbon dioxide gas emitted from yeast in the dough causes the dough to rise or expand. The dough is then permitted to rise during a first rise period. Following this first rise period, the machine kneads and "degasses" the dough, causing carbon dioxide to be released from the dough and reducing the size of the dough mass. The dough is then permitted to rise a second time. A further step of kneading/degassing is typically followed by a third, or final, dough rise period. Then the dough is baked in the breadmaker. Conventional breadmakers provide a knead time of about 20 minutes and a rise time of about 100 minutes, including a first rise period of about 35 minutes, a second rise period of about 15 minutes and a final rise period of about 50 minutes. The duration of the baking cycle is about 60 minutes. Therefore, the total cycle time typically is about 3 hours.

This relatively long cycle time is a significant shortcoming of household breadmakers. Unlike conventional baking which uses an oven to bake previously prepared bread dough, breadmakers must mix bread ingredients, knead the ingredients into dough, and provide periods of inactivity to allow the dough to rise prior to baking the dough. Consequently, planning is required on the part of the user because the breadmaking process must be initiated three hours or more prior to the time at which the bread will be served. Thus, to prepare fresh baked bread for breakfast, such as at 6 A.M., the breadmaking process must be started around 3 A.M. Although some breadmakers include a timer that allows delayed starting of a breadmaking process, the maximum delayed start provided by such timers is typically only about twelve hours. Moreover, the bread ingredients, such as flour, water and yeast, etc., must be prepared the evening before and left in the machine overnight. It is well known that the yeast must be kept separated from the water until the bread producing process is started. One reason is that the rise time may be affected by the biological activity of the yeast or the amount of yeast used. In addition, exposing the bread ingredients to hot and cold temperature conditions overnight, especially during summer and winter months, can affect the quality of the bread produced from these ingredients. A further consideration is that noise associated with the kneading operations of known household breadmakers can be disturbing, especially during early morning hours.

Some known breadmakers allow dough preheating. However, such preheating is provided prior to the start of the breadmaking operation of conventional breadmakers, thus lengthening the total cycle beyond the normal three hour period. Moreover, in known breadmakers which provide a preheat cycle, the preheat temperature is 28° C. or less.

Thus, known automatic breadmakers are characterized by a relatively long cycle time. An improved method of operation for a breadmaker providing a shorter cycle time while producing attractive, soft and delicious bread, would be an important advance in the art.

SUMMARY OF THE INVENTION

The present invention provides a rapid cycle household automatic breadmaker. Unexpectedly, the inventors have determined that the use of a higher preheat rise and baking temperature and a higher RPM for the kneading bars allow a significant reduction in the knead cycle time and the rise cycle time, without degrading the quality of the resulting bread. In addition, a hotter liquid and a faster rising yeast are used. In one embodiment, the knead cycle time is reduced to approximately 10 minutes and the rise cycle time is reduced to approximately 20 minutes. It has further been determined that a higher baking temperature, in the range of 216° C. to 232° C. (375° F. to 400° F.) can be used when the baking time is reduced, such as to 30 minutes. For these process parameters, the total breadmaking cycle is reduced to approximately 60 minutes or even less while surprisingly producing very high quality bread.

In accordance with one aspect of the invention, there is provided a method for producing bread in a household automatic breadmaker from dough made from bread ingredients. In accordance with the invention, the bread ingredients are introduced into the oven chamber of the breadmaker and the bread ingredients are preheated to a preheat temperature. A motor is actuated to drive one or more kneading bars for kneading the bread ingredients into the dough during a kneading cycle, the motor being deactivated at the end of the kneading cycle. The dough is allowed to rise during at least one rise time cycle. Then, a heater is activated for heating the oven chamber for baking the bread at a bake temperature during a baking cycle. The total duration of the preheating, kneading cycle, the rise time cycle and the baking cycle is about one hour. In one highly preferred embodiment, the duration of the kneading cycle is about ten minutes, the duration of the rise time cycle is about twenty minutes and the duration of the baking cycle is no more than about thirty minutes.

In one highly preferred embodiment, the step of preheating the bread ingredients includes supplying relatively hot water (e.g., about 50° C.) to the bread ingredients for preheating the bread ingredients to the preheat temperature during the kneading cycle time. Preferably, the bread dough is maintained at the preheat temperature at least for the duration of the kneading cycle and for at least a portion of the rise time cycle. In one preferred embodiment, the preheat temperature is in the range of about 49° C. to 54° C. The bread dough is baked at a temperature of about 216° C. to 232° C. during the baking cycle.

In accordance with a further aspect of the invention the household automatic breadmaker comprises an oven chamber; a bread pan removably positionable in the oven chamber; and an opening for introducing heated fluid into the bread pan for helping preheat the bread ingredients to a temperature in the range of about 49° C. to 54° C. The automatic breadmaker includes a driving motor for a kneading bar for kneading the bread ingredients into the dough, and a heater for heating the oven chamber during a baking cycle. A controller activates the motor at the start of a kneading cycle and deactivates the motor at the end of the kneading cycle. In addition, the controller activates the heater during the rise time cycle and for heating the oven chamber to a bake temperature for baking the bread at the bake temperature during a baking cycle. The controller includes a timer for defining the duration of about 10 minutes or less for the kneading cycle, a duration of about 20 minutes or less for the rise time cycle, and a duration of about 30 or less minutes for the baking cycle.

DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENTS

Figure 1:
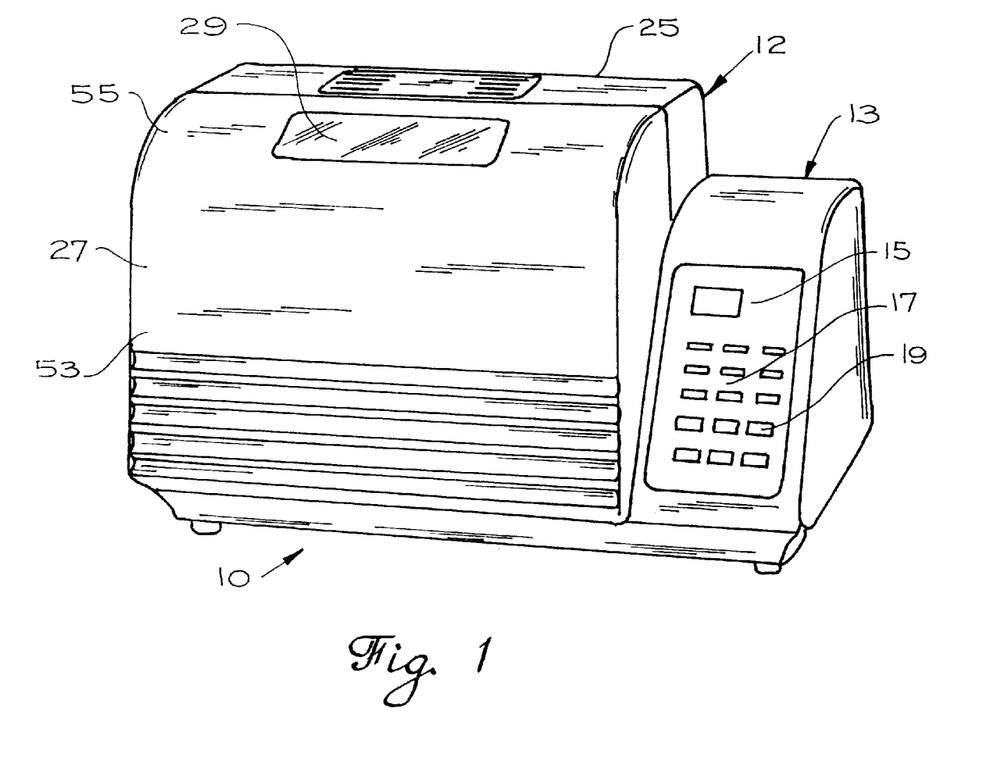
FIG. 1 is a perspective view of a suitable household automatic breadmaker which may be used to carry out the method of the invention.
Figure 2:
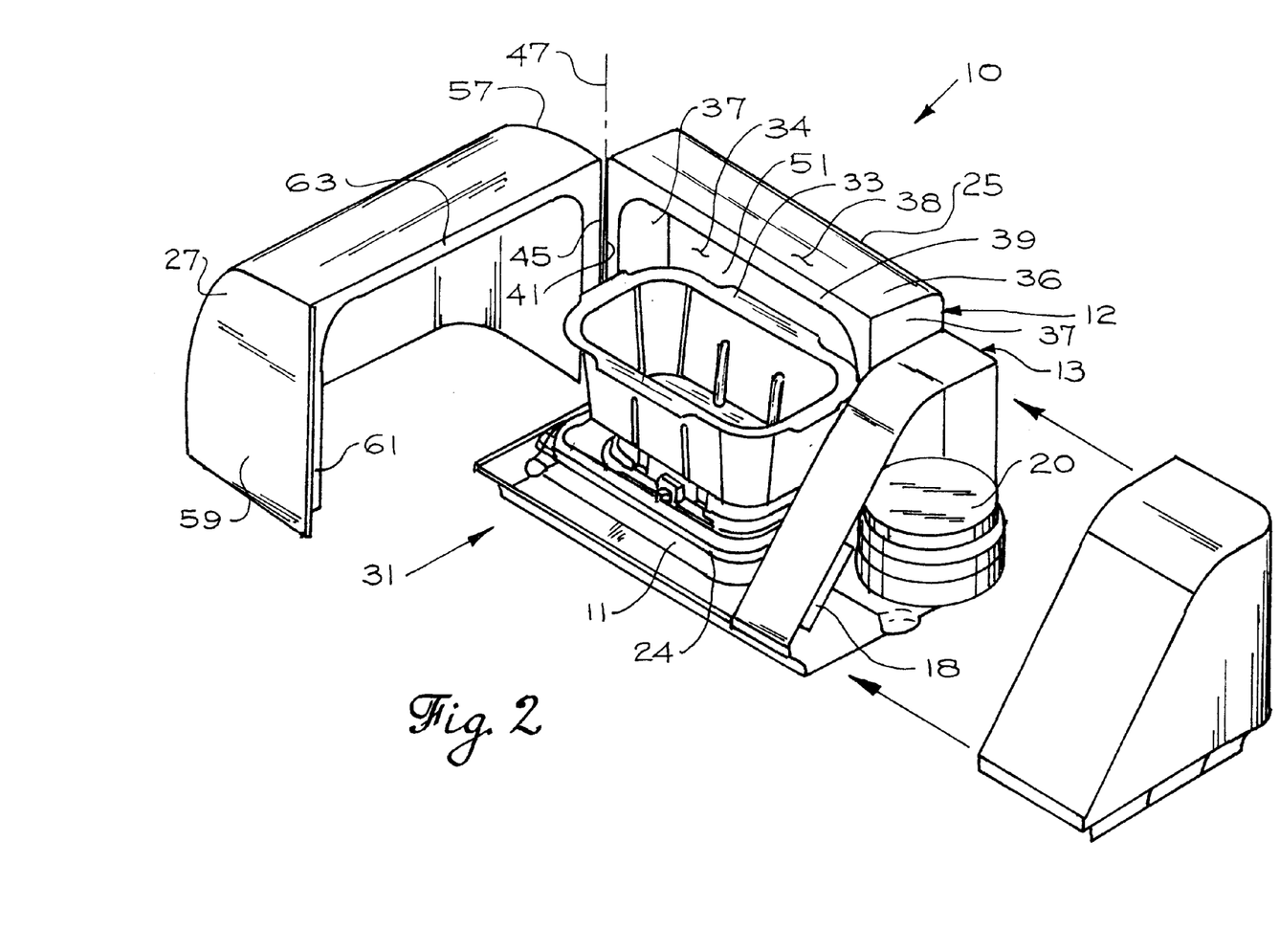
FIG. 2 is a perspective view of the household automatic breadmaker of FIG. 1 with the door open.

Referring to the drawings, FIGS. 1 and 2 illustrate an automatic breadmaker 10 provided in accordance with one aspect of the invention and which has a rapid bread producing cycle. The automatic breadmaker 10 is preferably intended for home use and thus, is referred to herein as a household automatic breadmaker. The household automatic breadmaker 10 is relatively inexpensive, compact and produces a single loaf of bread at a time, and can be used to produce different types of bread, in stark contrast with commercial units which are relatively expensive, large and produce multiple loaves at one time. These commercial units are unsuitable for household use due to their expense, large size, high power requirements and unacceptably large product output.

A wide variety of household automatic breadmaker 10 external designs can be used in accordance with the invention, including top load breadmakers with a single kneading bar or a side load breadmaker such as the one illustrated in FIGS. 1 and 2, which has two kneading bars. Considering the illustrated household automatic breadmaker 10 in more detail, the automatic breadmaker 10 has a housing 12 and a side compartment 13. The compartment 13 includes a user's panel 15 with a control mechanism 17 for selecting bread types etc., and indicators 19 for indicating the cycle in which the breadmaker currently is operating. The compartment 13 encloses a controller 18 and a reversible electric motor 20. The controller executes all of the steps making up the operating cycle of the breadmaker 10. The motor 20 drives kneading bars 21 and 22 (FIG. 3) for mixing bread ingredients to make bread dough, and for kneading the dough.

Figure 3:
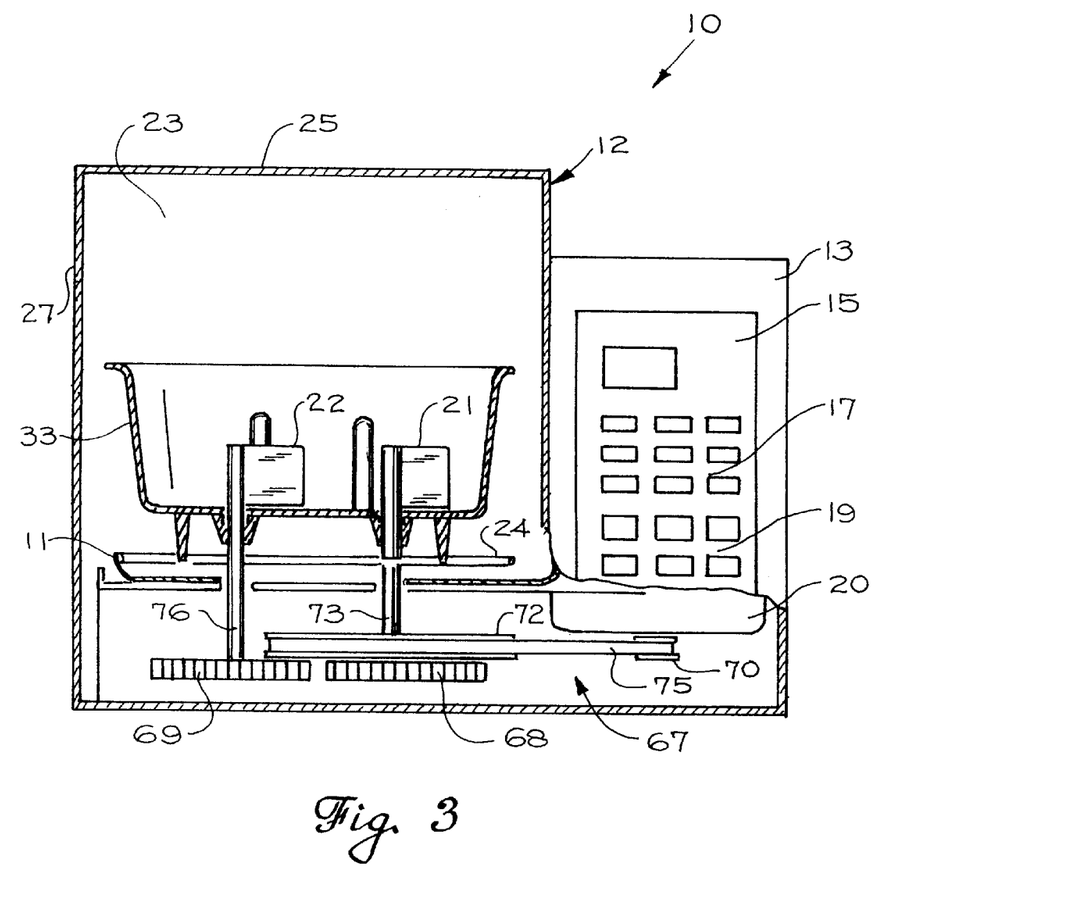
FIG. 3 is front elevation view, partially in section, of the household automatic breadmaker of FIG. 1.

The housing 12 defines an oven chamber 23 which abuts the compartment 13, and which is formed by a floor 11, a wall member 25 and an access door 27 having a window 29, allowing the user to view kneading and baking operations. A bread pan 33 is adapted to be received in chamber 23 for containing bread ingredients during the bread producing process. The access door 27 is hinged to the wall member 25 and swings in a substantially horizontal direction and creates a front opening 31, extending substantially to the floor 11 to the region above the pan 33 and to the side portions 35.

The wall member 25 has a rear portion 34, a top portion 36 and lateral side portions 37, all of which are fixed, i.e., non-movable with respect to one another and to the floor 11. The surface 38 of the top portion 36 is at a level above the breadmaker floor 11 and the portions 36 and 37 define a flat face which is substantially perpendicular.

The wall member 25 also has a vertical lateral edge 41 and a horizontal top edge 39, the latter located substantially directly above the pan 33 and extending along the pan length. In a highly preferred embodiment, the access door 27 is hinged to the wall member 25 along the front lateral edge 41 of the wall bar and along a rear lateral edge 45 of the door and is pivotable laterally about a substantially vertical axis 47. Thus, the access door swings in a substantially horizontal direction and creates a front opening 31 extending substantially to the floor 11, to the region above the pan and to the side portions 37.

The door 27 itself has a front surface 53 and a top surface 55, both of which are attractively curvilinear. There are also substantially flat first and second side surfaces 57, 59, respectively, the former having a substantially vertical rear edge 45. At least major portions of the top surface 55 and the first side surface 57 extend rearwardly from the front surface 53. The door swings laterally for front opening.

The portions 55, 57, 59 also define a flat face 61 which is substantially perpendicular and which abuts the face 39 of the wall member 25 when the door 27 is closed for baking. When the access door is closed, it extends upwardly from along the oven floor 11 and curves rearwardly to a position directly above the pan 33. That is, the top edge 63 of the door abuts the top edge 39 of the wall member 25 directly above the pan. When the door 27 is open, the breadmaker 10 opens at the top as well as at the front and sides, so that insertion and removal of the pan is further facilitated.

A heater 24 is located in the lower portion of the oven chamber 23. The heater 24 is energized by power circuits (not shown) mounted in thebar compartment 13. The heater 24 preferably heats air within the housing for heating the oven chamber 23 during bread making process by convection heating.

Figure 4:
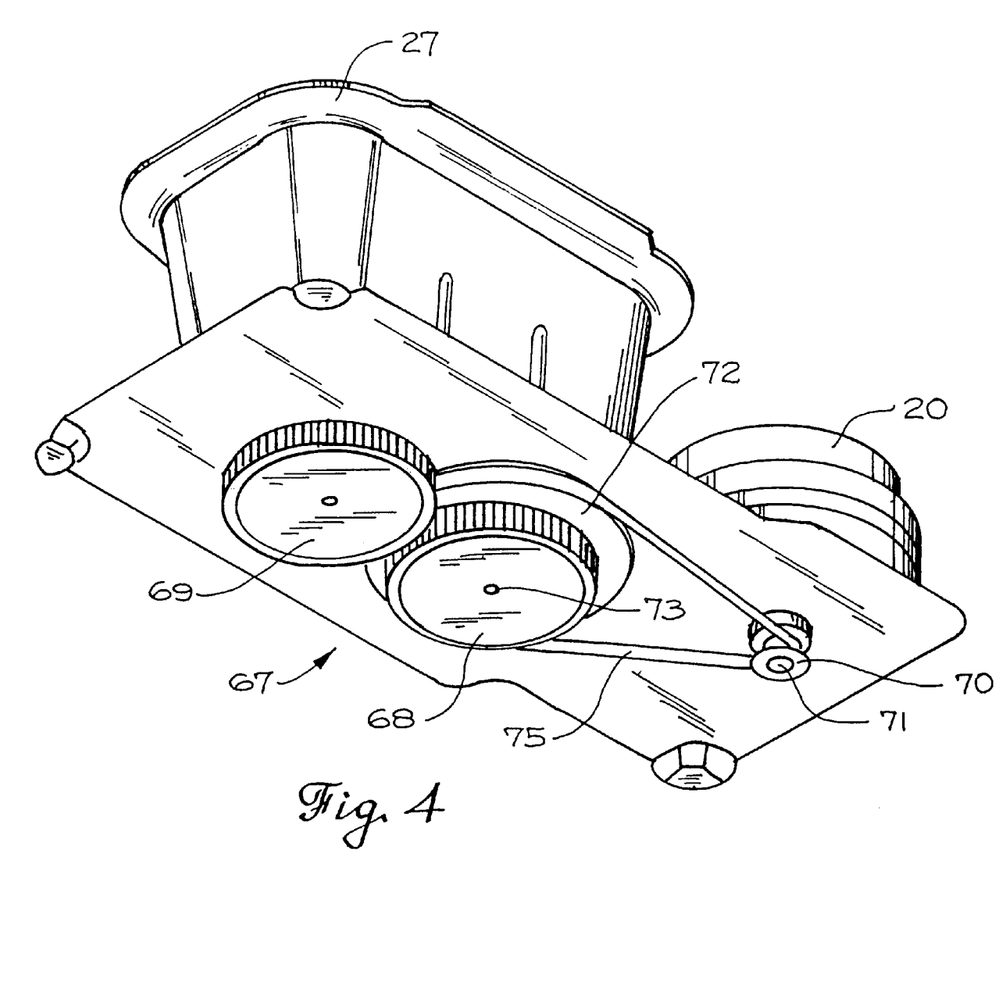
FIG. 4 is an underside perspective view of the arrangement for driving the kneading bars of the breadmaker.

Referring also to FIGS. 3 and 4, the motor 20 drives the kneading bars 21 and 22 through a drive mechanism including a belt and pulley mechanism 67 and gears 68 and 69. The belt and pulley mechanism 67 includes a small diameter drive pulley 70 attached to and rotating with the shaft 71 of the motor 20 and a driven pulley 72. Such pulley 70 is linked by a 75 belt to larger-diameter driven pulley 72 which rotates at a speed well below that of pulley 70.

Intermediate-diameter gear 68 is mounted on and concentric with pulley 72 and, of course, rotates at the same speed as the pulley 72. The gear 68 engages the gear 69 which is also of intermediate diameter equal to that of the first gear 68. From the foregoing, it is apparent that for either direction of motor rotation, the gears 68 and 69 rotate in opposite directions at the same speed.

The shaft 73 driving one of the kneading bars 21 is concentric with the pulley 72 and the gear 68 and the shaft 76 driving the other kneading bar 22 is concentric with the gear 69. The shafts 73 and 76 are substantially parallel to one another and both shafts rotate at the same speed which, of course, is much lower than the shaft speed of the motor.

Figure 5:
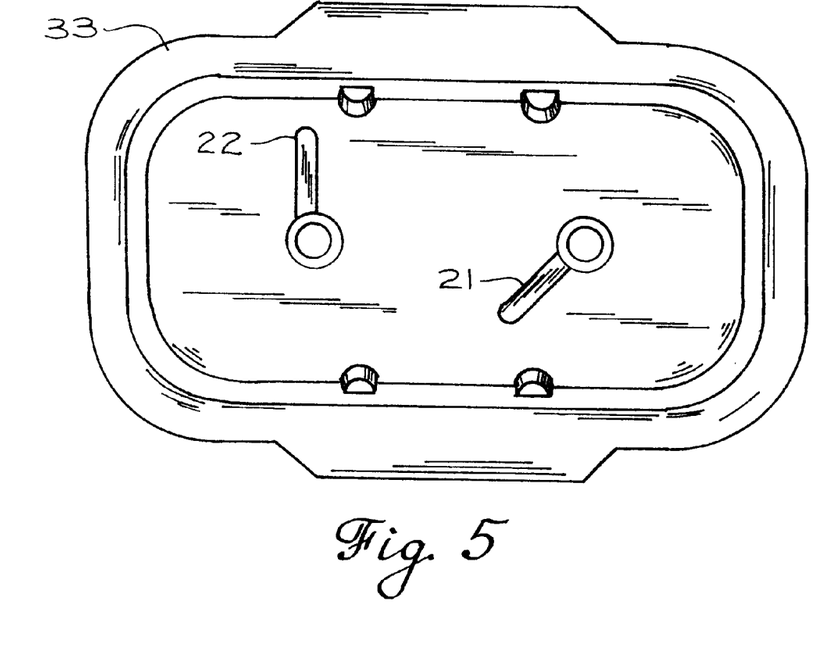
FIG. 5 is a top plan view of one embodiment of a bread pan used with the household automatic breadmaker of FIGS. 1 and 2.
Figure 6:
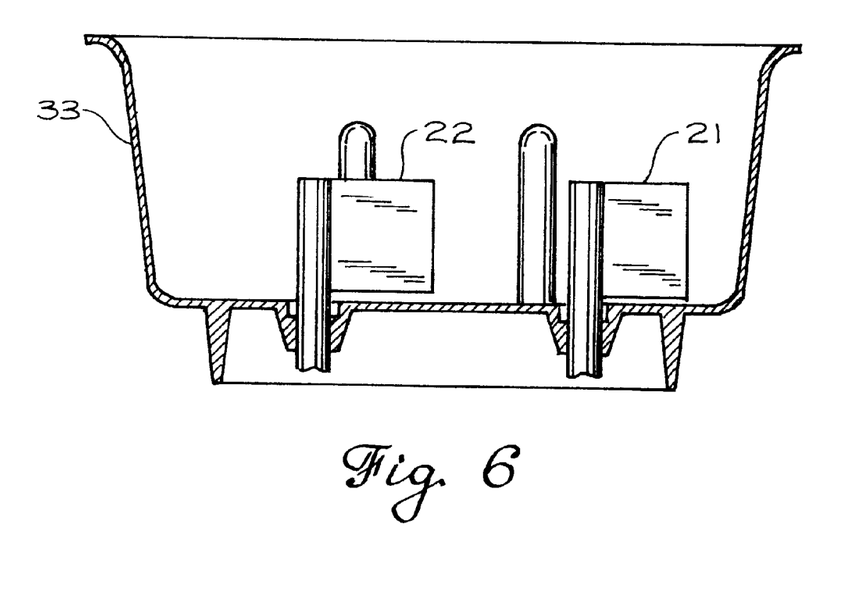
FIG. 6 is a side elevation view in section, of the bread pan of FIG. 4.

FIGS. 5 and 6 show the elongated horizontal bread pan 33 for receiving bread ingredients to be mixed to make bread dough. For breadmaking, the bread pan 33 is mounted in the oven chamber 23. The bread ingredients placed in bread pan 33 are manipulated by the kneading bars 21 and 22 which can be rotated in forward and reverse directions by the motor 20.

In operation of the household automatic breadmaker 10, bread ingredients are placed in the bread pan 33 through the open top thereof, the bread pan 33 is placed in the chamber 23, and the breadmaker 10 executes steps involving ingredient mixing, dough kneading and dough degassing. Each degassing step is followed by a dough rise period. Kneading and manipulation of the dough is provided by rotation and counter-rotation of kneading bars 21 and 22. In the breadmaker 10, the duration of each mixing, kneading, degassing and rising step is preprogrammed.

Digressing, known bread producing operations include a plurality of processing cycles, including mixing, kneading, rising and degassing steps. The process parameters, including cycle times and temperatures, for a typical prior art automatic breadmaker are summarized in TABLE I, along with corresponding process parameters for the automatic breadmaker provided by the present invention.

TABLE I

| | Process parameters | |
| --- | --- | --- |
| | Prior Art | New |
| knead time | 20 min. | 10 min. |
| rise time | 100 min. (short/35 min.) (mid/35 min.) (long/50 min.) | 20 min. |
| bake time | 60 min. | 30 min. |
| total cycle time | 180 min. (3 hours) | 60 min. (1 hour) |
| preheat temp | 27° C. | 49° C.–54° C. (using hot water) |
| rise temp | 27° C. | 49° C. |
| bake temp | 160° C.–170° C. | 216° C.–232° C. |

Conventional breadmakers provide a knead cycle time on the order of 20 minutes. Moreover, the breadmaking process incorporates a plurality of rise cycles, including amid rise cycle that is typically 35 minutes long, a short mid-rise cycle that is typically 15 minutes long, and a final rise cycle that is typically 50 minutes in duration. Thus, known automatic breadmakers generally require a total rise cycle time on the order of 100 minutes. Knead cycles are usually provided between the mid and short-rise time cycles and between the short-rise and long rise time cycles. The baking cycle for known breadmakers is typically on the order of 60 minutes and the baking temperature is typically in the range of 160° C. to 170° C. Thus, the total cycle time is about three hours and it has been widely believed that reducing this cycle time significantly reduces bread quality.

The present invention involves a method which shortens the total processing time for the breadmaker and produces high quality bread. In accordance with the invention, the bread dough is preheated to a predetermined preheat temperature. Although the use of preheating bread dough is known in conventional breadmakers, known automatic breadmakers use a preheating temperature on the order of 28° C. In contrast, the present invention uses a higher preheat temperature and maintains the higher temperature for the duration of the rise time cycle.

Unexpectedly, the inventors have determined that the use of a higher preheat temperature and a higher RPM for the kneading bars allow a significant reduction in the knead cycle time and the rise cycle time while still enabling high quality bread production. In addition, a hotter liquid, i.e. water, and a faster rising yeast can be used. In one embodiment, the knead cycle time is reduced to approximately 10 minutes and the rise cycle time is reduced to approximately 20 minutes. It has further been determined that a higher baking temperature, in the order of 216° C. to 232° C. can be used when the baking time is reduced, such as to 30 minutes. For these process parameters, the total breadmaking cycle is reduced to approximately 60 minutes.

Thus in accordance with one aspect of the invention, the dough is preheated during the initial mixing and kneading cycle to a temperature in the range of 49° C. to 54° C. The preheating temperature of 49° C. to 54° C. is maintained for at least a portion of the rise cycle and preferably for the duration of the rise cycle. In one embodiment, the preheating is carried out by using hot water during mixing of the bread ingredients to form the bread dough. The rise time can be affected by the biological activity of the yeast or the amount of yeast used. Accordingly, the temperature of the water that is used to preheat the bread dough is selected to be as high as possible, but at least 5° below the kill temperature for the yeast being used. After the initial preheating with the hot water, the temperature of the bread dough can be maintained at the preheat temperature using the heater 24. The operating speed of the mixing vanes is preferably increased from 150 RPM to 200 RPM, as compared to known breadmakers. In addition, a fast rising yeast such as SAF yeast, Red Star Quick Rise Yeast, or Fleishman Rapid Rise Yeast is preferably used.

Figure 7:
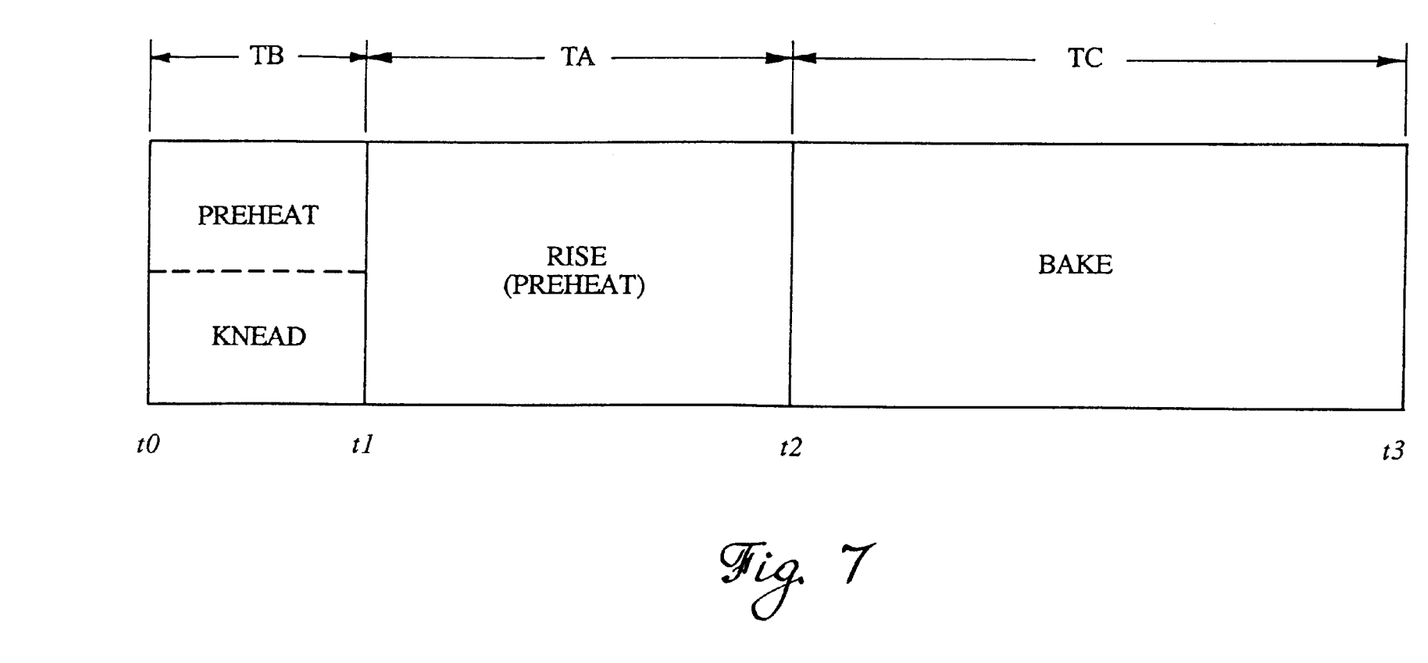
FIG. 7 is a timing diagram illustrating operating cycles of the household automatic breadmaker of this invention.

Further in accordance with the invention, the duration of the kneading cycle is limited to about 10 minutes, and in one preferred embodiment, is no more than 10 minutes or less. Moreover, the duration of the rise time is limited to about 20 minutes, and in one preferred embodiment is less than 20 minutes and the controller can maintain the rise temperatures of dough during the rise time. Also, the duration of the baking cycle is limited to about 30 minutes, and in one preferred embodiment is less than 30 minutes. During the baking cycle, the temperature of the oven chamber is maintained over 200° C., and in one preferred embodiment is at least 216° C. to 232° C. (375° F. to 400° F.) FIG. 7 is a timing diagram illustrating the operating cycles of the household automatic breadmaker of the present invention.

Figure 8:
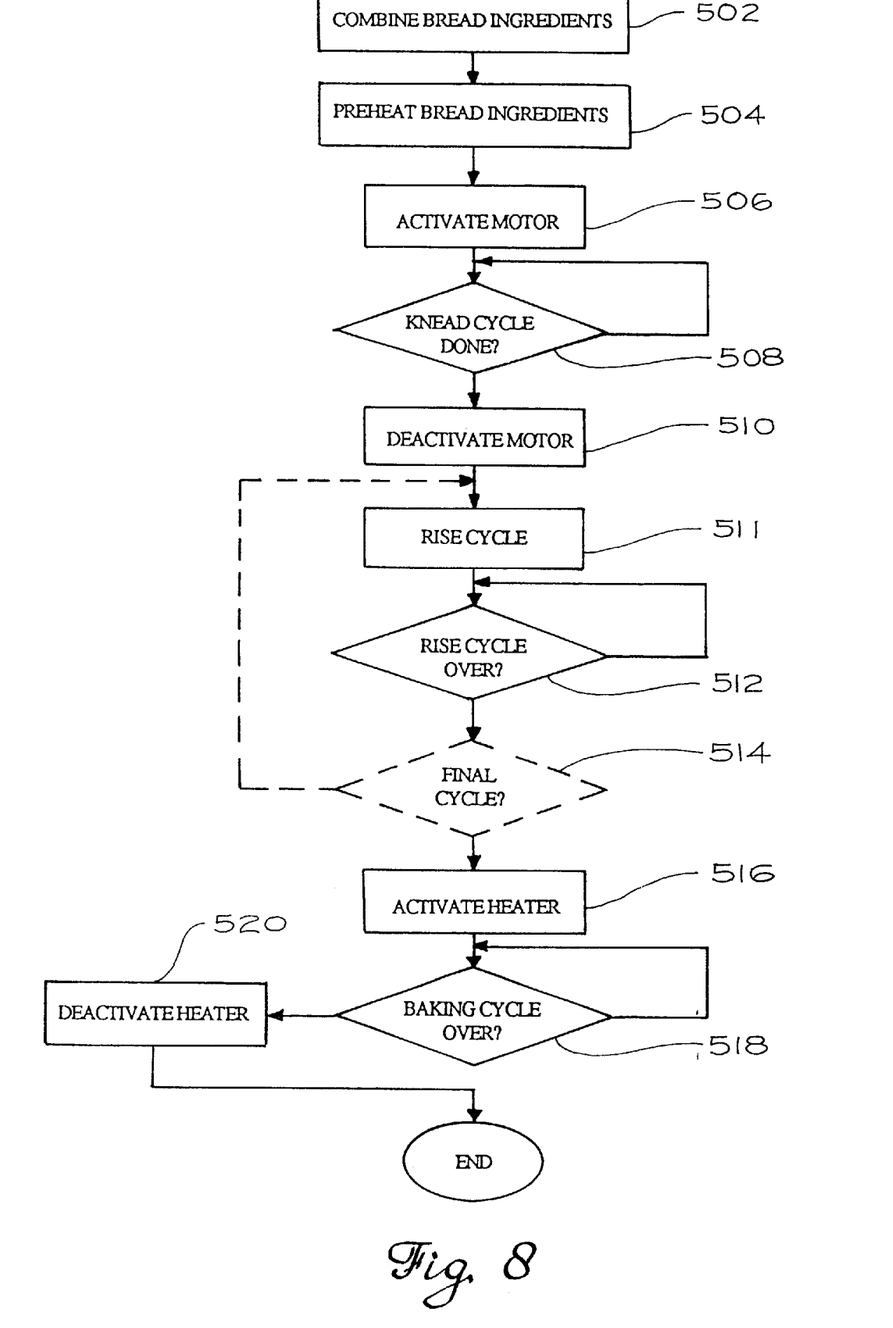
FIG. 8 is a process flow diagram illustrating the operation of the household automatic breadmaker of this invention.

FIG. 8 is a process flow chart for illustrating the method for producing the bread according to the invention. Referring to FIGS. 2, and 5–8, the dough ingredients, typically flour, sugar, dry milk, yeast, shortening, salt, etc. are deposited in the bread pan 33 through the open top thereof is represented by block 502. First, a measured amount of hot water is introduced into the bread pan 33 and the dry ingredients are added to the hot water. Then, the yeast is added. The temperature of the hot water is preferably approximately 5°–15° below the kill temperature of the yeast being used. The hot water added to the dry bread ingredients preheats the bread ingredients to a temperature of approximately 49° C. to 54° C. as represented by block 504.

At time t0 (FIG. 7) motor 20 is activated to rotate thekneading blades 21 and 22 for mixing the bread ingredients and for kneading the bread ingredients into dough, block 506. Block 508 times the duration of the kneading cycle TA which in one preferred embodiment is 10 minutes. At the end of the kneading cycle (time t1 as determined by block 508) block 510 deactivates the motor 20. The dough is permitted to rest, allowing the dough to rise and ferment during a rise time cycle TB (block 511), the duration of which is defined by block 512. The controller can activate the heater 24 as necessary to maintain the temperature of the dough at 49° C. during the rise time cycle. In one preferred embodiment, the duration of the rise time cycle is 20 minutes. The rise time cycle can be a single cycle of a 20 minute duration or a plurality of cycles having a total duration of 20 minutes. At the end of the single rise cycle, (or a plurality of rise cycles as determined by block 514) flow proceeds to block 516.

Block 516 actuates the heater 24 at time t2 for the baking cycle TC. The heater 24 heats the air in the baking chamber 23 to a temperature greater than 200° C. and preferably in the range of 210° C. to 220° C. Block 518 times the duration of the baking cycle which in one preferred embodiment is 30 minutes. At the end of the baking cycle TC (at time t3), as determined by block 518, block 520 deactivates the heater 24, and the bread is allowed to cool.

The method according to the invention provides a bread making process, including preheating, kneading cycle, rise time and baking cycle having a total duration of about one hour or even less, in contrast to the three hour cycle time for prior art automatic breadmakers using conventional methods. The household automatic breadmaker of the present invention uses a higher baking temperature (which is about 100° C. above conventional temperatures) and a shorter baking time (which is about one-half the conventional time).

What is claimed is:

1. A method for producing bread in a household automatic breadmaker from dough made from bread ingredients, the automatic breadmaker including an oven chamber having an associated heater, and a motor for driving at least one kneading bar, the method comprising the steps of:

introducing the bread ingredients into the oven chamber;

preheating the bread ingredients to a preheat temperature in a range of about 49° C. to 54° C.;

actuating the motor to drive the kneading bar for kneading the bread ingredients into the dough during a kneading cycle;

deactivating the motor at the end of the kneading cycle;

allowing the dough to rise during at least one rise time cycle; and actuating the heater for heating the oven chamber for baking the bread at a bake temperature in a range of about 216° C. to 232° C. during a baking cycle, wherein the total duration of the preheating, kneading cycle, the rise time cycle and the baking cycle is about one hour.

2. The method according to claim 1, wherein the preheating of the bread ingredients is carried out during at least a portion of the kneading cycle.

3. The method according to claim 1, wherein the step of preheating the bread ingredients includes supplying a heated fluid to help preheat the dough to the preheat temperature during the kneading cycle, and further including the step of maintaining the preheat temperature for at least a portion of the rise time cycle.

4. The method according to claim 1, wherein the step of preheating the bread ingredients includes the further steps of supplying hot water to the dough for preheating the bread ingredients to the preheat temperature during the kneading cycle, and maintaining the dough at the preheat temperature for the duration of the rise time cycle.

5. The method according to claim 1, wherein the step of preheating the bread ingredients includes the further steps of activating the heater for preheating the bread ingredients to the preheat temperature during the kneading cycle, and maintaining the preheat temperature for the duration of the rise time cycle.

6. The method according to claim 1, including maintaining the preheat temperature at least 49° C. for the duration of at least one of the kneading cycle and the duration of the rise time cycle.

7. The method according to claim 1, wherein the one of the bread ingredients is yeast, and including the step of maintaining the preheat temperature at least 5° C. but no more than 30° C. be low a kill temperature for the yeast.

8. The method according to claim 1, including limiting the duration of the rise time cycle to about 20 minutes.

9. The method according to claim 1, including limiting the duration of the kneading cycle to about 10 minutes.

10. The method according to claim 1, including limiting the duration of the baking cycle to about 30 minutes.

11. A method for producing bread in a household automatic breadmaker from dough made from bread ingredients, the automatic breadmaker having an oven chamber, a heater, and a motor for driving at least one kneading bar, said method comprising the steps of:

preheating the bread ingredients to a preheat temperature in a range of about 49° C. to 54° C.;

activating the motor for kneading the bread ingredients into the dough during a kneading cycle;

deactivating the motor at the end of the kneading cycle to allow the dough to rest;

fermenting the dough during at least one rise time cycle;

activating the heater for heating the oven chamber to a bake temperature in a range of about 216° C. to 232° C.;

baking the bread at the bake temperature for a baking cycle, whereby the duration of the total cycle time for the automatic breadmaker is about 60 minutes.

12. The method according to claim 11, including continuing preheating the bread ingredients to the preheat temperature during the kneading cycle, and maintaining the preheat temperature for the duration of the rise time cycle.

13. The method according to claim 11, including limiting the duration of the rise time cycle to no more than 20 minutes.

14. The method according to claim 11, including limiting the duration of the kneading cycle to no more than 10 minutes.

15. The method according to claim 11, including limiting the duration of the baking cycle to no more than 30 minutes.

16. A method for producing bread in a household automatic breadmaker from dough made from bread ingredients, the automatic breadmaker having an oven chamber, a heater, and a motor for driving at least one kneading bar, said method comprising the steps of:

preheating the bread ingredients to a temperature in a range of about 49° C. to 54° C.;

activating the motor for kneading the dough during a kneading cycle of a duration of about 10 minutes;

deactivating the motor at the end of the kneading cycle to allow the dough to rest;

fermenting the dough during at least one rise time cycle of a duration of about 20 minutes;

activating the heater for heating the oven chamber to a bake temperature in a range of about 216° C. to 232° C.; and baking the bread at the bake temperature for a baking cycle of a duration of about 30 minutes, whereby the duration of the total cycle time for the automatic breadmaker is about 60 minutes.

17. A household automatic breadmaker for producing bread from dough made from bread ingredients, said automatic breadmaker comprising:

an oven chamber;

a bread pan removably positionable in the oven chamber;

an opening for introducing heated fluid into the bread pan for helping preheat the bread ingredients to a temperature in a range of about 49° C. to 54° C.;

at least one kneading bar for kneading the bread ingredients into the dough;

a motor for driving the kneading bar;

a heater for heating the oven chamber during a baking cycle; and a controller for activating the motor during a kneading cycle and for deactivating the motor at the end of the kneading cycle;

the controller defining a rise time cycle during which the dough is allowed to rise;

the controller activating the heater for heating the oven chamber to a bake temperature in a range of about 216° C. to 232° C. for baking the bread at the bake temperature during a baking cycle; and wherein the controller includes a timer for defining the duration of less than about 10 minutes for the kneading cycle, for defining a duration of less than about 20 minutes for the rise time cycle, and for defining a duration of less than about 30 minutes for the baking cycle, whereby the duration of the total cycle time for the automatic breadmaker is about 60 minutes.

18. The automatic breadmaker according to claim 17, further including a temperature sensing device for producing an output indicative of temperature of the oven chamber, the controller being responsive to the output for controlling the heater to maintain the oven chamber at the bake temperature in the range of about 216° C. to 232° C. during the baking cycle.

19. The automatic breadmaker according to claim 17, wherein the controller defines a kneading cycle during which the bread ingredients are maintained in the range of about 49° C. to 54° C.

20. A household automatic breadmaker for producing bread from bread ingredients, said automatic breadmaker comprising:

an oven chamber;

a bread pan removably positionable in the oven chamber;

an opening for introducing a heated fluid into the bread pan for preheating the bread ingredients to a temperature in the range of about 49° C. to 54° C.;

at least one kneading bar for kneading the dough;

a motor for driving the kneading bar;

a heater;

a controller for activating the motor during at least one kneading cycle, the controller deactivating the motor at the end of the kneading cycle to define a rise time cycle during which the dough is allowed to ferment, and the controller activating the heater for maintaining the dough at a rise temperature and heating the oven chamber to a bake temperature for baking the dough at the bake temperature during the baking cycle; and a temperature sensing device for sensing the temperature of the oven chamber;

the controller being responsive to the temperature sensing device for maintaining the oven chamber at a temperature in the range of about 216° C. to 232° C. during the baking cycle;

wherein the controller includes a timer for defining the duration of the kneading cycle to be about 10 minutes, for defining the duration of the rise time cycle to be about 20 minutes, and for defining the duration of the baking cycle to be about 30 minutes, whereby the duration of the total cycle time for the automatic breadmaker is about 60 minutes.

* * * * *